UNITED STATES PATENT OFFICE.

JOHN K. ALPAUGH, OF DECATUR, ILLINOIS.

SOAP-POWDER AND PROCESS OF MAKING THE SAME.

SPECIFICATION forming part of Letters Patent No. 282,032, dated July 31, 1883.

Application filed December 2, 1882. (No specimens.)

*To all whom it may concern:*

Be it known that I, JOHN K. ALPAUGH, a citizen of the United States of America, residing at Decatur, in the county of Macon and State of Illinois, have invented certain new and useful Improvements in Soap-Powders and the Processes of Making the Same, of which the following is a specification.

This invention relates to a new kind of soap-powder and the process of preparing the same; and it consists in making a powder from the roots of palmea, or similar plants containing saponin, and in the process whereby said powder is prepared, which process is hereinafter more fully described and claimed.

In preparing my powder I prefer the following process: I take the root of the palmea, or any other similar plant containing saponin, and, after removing the bark or outer covering, cut it into chips by any suitable machine. I then dry the chips so produced in any convenient manner, after which I pass the chips through a machine, which further reduces them to particles about the size of peas or corn, in which condition I grind said particles by any suitable grinding apparatus, but preferably by grinding them between burrs, until the particles are reduced to a fine powder, mixed with woody fiber. I now take the powder and bolt or sift the same, thereby extracting the fiber from the powder, which latter is now in a condition to be used for cleansing or laundry purposes; or it may be used as one of the ingredients for making soaps.

By this process I make a most effective and convenient detergent from a material that is growing wild and in the greatest profusion in New Mexico, which detergent can therefore be produced very cheaply and in immense quantities, and which, although it has great cleansing qualities, has no injurious effects on the finest fabrics, nor will it injure the tenderest skin; but, on the contrary, it has a great healing tendency, and keeps the skin soft and free from chaps, pimples, or sores.

In some cases I do not remove the fiber, but leave it in the powder, especially if it is to be used for the production of cheap soap, or if the powder is being produced from such classes of plants in which the saponin cannot be all removed by the grinding process. Where there is much saponin combined with the fiber that cannot be removed by grinding, I sometimes steam or steep it and extract the saponin by pressure, or otherwise, and then use the extract for making soaps or cleansing compounds. I sometimes make the chips so small that the second reduction is unnecessary, as the chips may in that case be ground up as soon as the drying process is completed without the intermediate reduction.

I also propose, in some cases and with some special classes of plants in which the saponin cannot well be obtained by grinding and bolting, to make an extract in any suitable manner and then evaporate said extract to dryness. The same process may be used with the fiber sifted from the powder, if preferred.

I do not wish to limit myself to the production of soap-powder from the plants of the palmea, although I believe that it is the best for the purpose independent of the peculiar virtues of the products, as it contains the largest amount of saponin of any plant with which I am acquainted, the fibers appearing as if cemented together with saponin, and is readily separated by the process hereinbefore described.

I am aware that saponin has been extracted from various plants and has been used in washing compounds, and hence do not claim, broadly, the idea of utilizing saponin for washing purposes; nor do I claim, broadly, in this application the utilization of saponin from palmea plants, as I have another application, which was allowed November 24, 1882, describing and claiming soap compounds wherein the extract and pulp made from the palmea are used.

What I claim as new is—

1. The process of producing soap-powder, herein described, which consists, first, in making the root or wood of any suitable tree or plant into chips, then drying the same and reducing the chips to powder, substantially as and for the purpose set forth.

2. The process of producing soap-powder, herein described, consisting in first making the root or wood of any suitable plant into chips, then drying the same, next breaking the chips into small particles, and finally grinding the same into powder, substantially as and for the purpose set forth.

3. The process of producing soap-powder, herein described, consisting in first cutting the root or wood of any suitable plant into chips, then drying the same, next breaking the chips into small particles and grinding the same to powder, and finally bolting or sifting the fiber from the powder, substantially as and for the purpose set forth.

4. The new article of manufacture herein set forth, consisting of dried saponin reduced to a powder.

In testimony whereof I affix my signature, in presence of two witnesses, this 17th day of November, 1882.

JOHN K. ALPAUGH.

Witnesses:
JAMES W. REAVIS,
C. F. KNOWLES.